Patented Mar. 14, 1933

1,901,383

UNITED STATES PATENT OFFICE

GEORGE VOOGT, OF HAMBURG, GERMANY, ASSIGNOR TO SHELL DEVELOPMENT COMPANY, OF SAN FRANCISCO, CALIFORNIA, A CORPORATION OF DELAWARE

PROCESS FOR RECOVERING THE OIL-SOLUBLE SULPHONIC COMPOUNDS FORMED IN THE ACID REFINING OF MINERAL OILS

No Drawing. Application filed March 25, 1931, Serial No. 525,327, and in Germany March 31, 1930.

In the refining of mineral oils or petroleum distillates by treating these with ordinary concentrated or fuming sulphuric acid it is usual to add alkali lye and alcohol to the oil after the removal of the acid sludge. The alcoholic-alkaline sublye thus obtained contains the oil-soluble sulphonic acids and naphthenic acids present in the oil in the form of alkali soaps, in addition to substantial quantities of mineral oil and salts. After distilling off the alcohol and steaming out the water from the sublye a more or less water-free product is obtained, which contains besides the sulphonic soaps such large quantities of mineral oil and ash, particularly sodium sulphonate, that in most cases it is unsuitable for the known applications of sulphonic acids and sulphonic soaps, e. g. as fat-splitting agents or as emulsifiers or stabilizers for the manufacture and stabilization of dispersions. Moreover it is commercially profitable to recover the oil from the sublye.

It should further be noted that in order to make the process of extracting the oil-soluble sulphonic substances economically workable, only the smallest possible quantity of alcohol required for the complete extraction should be used, and it has been found that the oil content of the separated sulphonic soaps is greater according as the quantity of alcohol used is smaller. Thus, in practice, the oil content of the products may vary between 25 and 50% of the total quantity of material containing sulphonic soaps obtained from the sublye. If, however, the quantity of alcohol taken is such as to obtain the sulphonic soaps in a sufficiently oil-free form, the quantities of solvent required are so large as to render the process commercially impracticable on account of the unavoidable losses of alcohol.

It has already been proposed to separate the mineral oil out of the above-mentioned sublye by the addition of alcohols or other volatile solvents, whereupon the sulphonic soaps, after removal of the solvent, may be decomposed by means of a strong acid. Great difficulties are, however, experienced in carrying this process into practice, particularly on account of the resultant emulsification; a further drawback of this process is that in general it is not possible to obtain a sufficiently intensive separation of the oil and the salt from the product. Thus, for instance, in carrying out said process I have used 300% of ethyl alcohol calculated on the weight of the total amount of sublye, and yet the oil content of the sulphonic soap was not substantially reduced thereby.

It has also been proposed already to free the salt-containing sulphonic acids, separated out of their salts, from their ash-constituents, by a single or repeated washing with sulphuric acid. In practice it appeared, however, that in spite of repeated washings a substantial amount of sodium sulphate is left in the ready sulphonic acids.

According to a further process the sulphonic acids washed with sulphuric acid in the manner described above and still containing sulphuric acid, are dissolved in alcohol, and this solution is treated with an excess of sodium carbonate, whereby the sodium sulphonates can be extracted by evaporating the alcoholic solution after separation of the excess of soda and the sodium sulphate formed.

However, a satisfactory solution of the problem of recovering the sulphonic soaps freed as much as possible from mineral oil and ash has not yet been found, seeing that none of the known processes enables an intensive purification of the treated sulphonic soaps in a simple and economic manner.

Now my invention provides for a process whereby the sulphonic soaps can be recovered in a purified state, both with regard to the oil content and to the ash content, in a simple and economic manner from an alcoholic-alkaline sublye, containing besides sulphonic soaps a substantial amount of oil and mineral constituents, under recovery of the oil passed into the sublye.

My new process consists in treating the separated sublye, without previously distilling off the alcohol, with a small amount of an agent having a flocculating action, e. g. common salt or some other suitable soluble salt, whereby the mixture of sulphonic soaps and oil is separated from the main quantity of the alcohol, water, ash and separating agent. After removal of the alcohol-and-water layer, the sulphonic soap-oil mixture is treated with a suitable solvent, e. g. concentrated ethyl alcohol; the sulphonic soaps present in the mixture are thereby dissolved, and after some time the oil and part of the ash precipitate. By distilling off the solvent the sulphonic soaps can then be obtained in a purified state.

A more intensive purification can be effected by dissolving the sulphonic soaps, obtained by evaporating the alcoholic solution to dryness, in a suitable solvent, e. g. concentrated alcohol, whereby the salts and ash still present are separated out.

In a special embodiment of my invention the separated sulphonic soap-oil mixture is first evaporated to dryness and the sulphonic soap dissolved out by means of a suitable solvent, e. g. concentrated alcohol.

Further I have found that a substantial separation of oil from the alcoholic solution of the sulphonic soap-oil mixture evaporated to dryness can be effected by adding so much water as will allow of the completest possible precipitation of the oil present in the solution.

An important advantage of my new process lies in a minimum quantity of alcohol or suchlike solvent being required for the extraction of the oil-soluble sulphonic compounds from the sulphonated oil, whilst nevertheless in consequence of the combined treatment with an agent having a flocculating action and a solvent the sulphonic soaps are obtained in economic manner in a state substantially free of ash and oil.

*Example I*

The mineral oil treated with sulphuric acid or fuming sulphuric acid containing about 1.4–1.8% oil-soluble sulphonic acids, after extraction of the acid sludge is treated with a quantity of lye sufficient to give the oil a neutral or weakly alkaline reaction; a more or less diluted, say 50% alcohol is subsequently added so that the sulphonic soaps separate out of the oil without considerable emulsification. The sublye thus formed contains e. g. about 20% alcohol, 60% water, 8% sulphonic soap, 8% oil and 4% ash. This sublye is extracted and subsequently treated with 1 to 3% sodium chloride. Two layers are formed, the upper layer (40 to 50% of the total quantity) containing the sulphonic soaps and the oil, with part of the water, the alcohol and the ash, whilst into the under-layer (50–60%) passes the greater part of the alcohol, water and mineral substances. When this under layer has been drawn off, the remaining sulphonic soap-oil mixture is treated with about half the quantity of 96% alcohol, whereby the oil settles out in a few hours, together with part of the ash present. The alcoholic sulphonic soap solution is then separated from the under layer and subjected to distillation.

The sulphonic soaps thus obtained only contain oil and inorganic salts in such quantities as may be designated as very small in comparison with those present in the original sublye. Now, in order to obtain the sulphonic soaps practically free from ash not combined therewith, the water-free material is dissolved again in 96% alcohol, whereby the mineral substances are separated out and the sulphonic soaps can be obtained in a relatively very pure condition.

*Example II*

The sublye obtained by the alcoholic-alkaline treatment of the sulphonated oil is treated, as in Example I, with 1 to 3% sodium chloride and the sulphonic soap-oil mixture thus drawn off is evaporated to dryness. This material, which still contains a considerable amount of mineral oil and ash, is then treated with 96% alcohol and dissolved therein. In the course of this treatment practically all the ash is separated out as well as a certain amount of oil which is not soluble in the concentrated alcohol. The supernatant alcoholic soap solution is subsequently diluted with about 20–30% water, whereby the greater part of the oil still present precipitates. The sulphonic soaps thus intensively purified can then be recovered from the alcoholic solution by distillation.

What I claim is:

1. The process of recovering the oil-soluble sulphonic compounds formed in the acid refining of mineral oils, which consists in separating the acid sludge from the oil, adding an alkaline solution and alcohol to the oil, whereby the oil soluble sulphonic compounds are separated from the oil in the form of alkali sulphonates, drawing off the alcoholic alkaline sublye containing the alkali sulphonates and treating said sublye with a salting out agent, drawing off the bulk of alcohol, water and dissolved mineral matters from the salted out sulphonate oil mixture, treating the said mixture with concentrated alcohol so as to dissolve the alkali sulphonates, separating the non-dissolved residue from the solution and evaporating the latter to dryness.

2. The process of recovering the oil-soluble sulphonic compounds formed in the acid refining of mineral oils, which consists in separating the acid sludge from the oil, adding an alkaline solution and alcohol to the oil, whereby the oil soluble sulphonic compounds are separated from the oil in the form of alkali sulphonates, drawing off the alcoholic alkaline sublye containing the alkali sulphonates and salting out said sublye with 1 to 3% of sodium chloride, drawing off the bulk of alcohol, water and dissolved mineral matters from the salted out sulphonic oil mixture, treating the said mixture with concentrated alcohol so as to dissolve the alkali sulphonates, separating the non-dissolved residue from the solution and evaporating the latter to dryness.

3. The process of recovering the oil-soluble sulphonic compounds formed in the acid refining of mineral oils, which consists in separating the acid sludge from the oil, adding an alkaline solution and alcohol to the oil, whereby the oil soluble sulphonic compounds are separated from the oil in the form of alkali sulphonates, drawing off the alcoholic alkaline sublye containing the alkali sulphonates and treating said sublye with a salting out agent, drawing off the bulk of alcohol, water and dissolved mineral matters from the salted out sulphonate oil mixture, treating the said mixture with concentrated alcohol so as to dissolve the alkali sulphonates, separating the non-dissolved residue from the solution and evaporating the latter to dryness, dissolving the latter evaporation residue in concentrated alcohol, separating the non-dissolved residue from the solution and evaporating the latter to dryness.

4. The process of recovering the oil-soluble sulphonic compounds formed in the acid refining of mineral oils, which consists in separating the acid sludge from the oil, adding an alkaline solution and alcohol to the oil, whereby the oil-soluble sulphonic compounds are separated from the oil in the form of alkali sulphonates, drawing off the alcoholic alkaline sublye containing the alkali sulphonates and treating said sublye with a salting out agent, drawing off the bulk of alcohol, water and dissolved mineral matters from the salted out sulphonate oil mixture, evaporating the said mixture to dryness, treating the evaporation residue with concentrated alcohol so as to dissolve the alkali sulphonates, separating the non-dissolved residue from the solution and diluting the latter with water so as to obtain a precipitation of the oil still present, separating the oil from the solution and evaporating the latter to dryness.

In testimony whereof I affix my signature.

GEORGE VOOGT.